(12) United States Patent
Prix

(10) Patent No.: US 9,000,631 B2
(45) Date of Patent: Apr. 7, 2015

(54) ELECTRIC DRIVE UNIT

(75) Inventor: Daniel Prix, Ebental (AT)

(73) Assignee: MAGNA Power Train AG & Co KG, Lannach (AT)

( * ) Notice: Subject to any disclaimer, the term of this patent is extended or adjusted under 35 U.S.C. 154(b) by 279 days.

(21) Appl. No.: 13/580,076

(22) PCT Filed: Jan. 28, 2011

(86) PCT No.: PCT/EP2011/051252
§ 371 (c)(1),
(2), (4) Date: Aug. 20, 2012

(87) PCT Pub. No.: WO2011/101224
PCT Pub. Date: Aug. 25, 2011

(65) Prior Publication Data
US 2012/0313465 A1    Dec. 13, 2012

(30) Foreign Application Priority Data
Feb. 19, 2010   (DE) .......................... 10 2010 008 584

(51) Int. Cl.
*H02K 11/00* (2006.01)
*H02K 5/20* (2006.01)
*H02K 1/32* (2006.01)
*H02K 5/22* (2006.01)
*H02K 7/116* (2006.01)

(52) U.S. Cl.
CPC .............. *H02K 11/0073* (2013.01); *H02K 1/32* (2013.01); *H02K 5/20* (2013.01); *H02K 5/225* (2013.01); *H02K 7/116* (2013.01)

(58) Field of Classification Search
USPC ............................. 310/52, 54, 58, 64, 88, 89
See application file for complete search history.

(56) References Cited

U.S. PATENT DOCUMENTS

| 4,262,224 | A | 4/1981 | Kofink et al. | |
| 7,525,224 | B2 * | 4/2009 | Takenaka et al. | 310/54 |
| 8,686,606 | B2 * | 4/2014 | Jiang et al. | 310/54 |
| 2008/0030085 | A1 * | 2/2008 | Gizaw et al. | 310/54 |
| 2009/0026857 | A1 * | 1/2009 | Lavall | 310/58 |
| 2010/0001597 | A1 * | 1/2010 | Noll | 310/58 |

* cited by examiner

*Primary Examiner* — Hanh Nguyen
(74) *Attorney, Agent, or Firm* — Jordan IP Law, LLC; Todd A. Vaughn

(57) ABSTRACT

An electric drive unit includes a stator which is received in a metal housing, and a rotor rotates within the stator. A synthetic material housing is arranged on the metal housing in the region of the stator, the synthetic material housing forming at least one cooling channel for a cooling fluid in order to cool the stator via the metal housing.

17 Claims, 4 Drawing Sheets

ELECTRIC DRIVE UNIT

CROSS-REFERENCE TO RELATED APPLICATIONS

The present application is a National Stage Application of PCT International Application No. PCT/EP2011/051252 (filed on Jan. 28, 2011), under 35 U.S.C. §371, which claims priority to German Patent Application No. 10 2010 008 584.7 (filed on Feb. 19, 2010), which are each hereby incorporated by reference in their respective entireties.

FIELD OF THE INVENTION

The invention relates to an electric drive unit having a stator which is received in a metal housing, and a rotor which can rotate within the stator. The stator and the rotor form an electric machine for driving an output element (e.g., flange, shaft) that is connected to the rotor. A drive unit of this type can be used as a drive source in a hybrid-electric vehicle.

BACKGROUND OF THE INVENTION

It is necessary to cool a electric machine depending upon the power consumption of the drive unit. As a consequence, the costs of manufacturing the metal housing for receiving the stator are undesirably high.

SUMMARY OF THE INVENTION

It is an object of the invention to provide an electric drive unit of the aforementioned type that whilst being simple to manufacture is light in weight.

This object is achieved by virtue of an electric drive unit having a stator which is received in a metal housing, and a rotor which can rotate within the stator. A synthetic material housing is arranged on the metal housing in the region of the stator, which synthetic material housing forming at least one cooling channel for a cooling fluid which cools the stator via the metal housing.

In the case of an electric drive unit, a synthetic material housing is arranged on the metal housing in the region of the stator. The synthetic material housing forms at least one cooling channel (preferably a plurality of cooling channels) for a cooling fluid (in particular, cooling water). This cooling fluid is used for the purpose of cooling the stator indirectly, namely via the metal housing.

The process of manufacturing the metal housing and, in particular, the cooling channels required thereon is considerably simplified by virtue of the additional synthetic material housing. In addition, the drive unit is particularly comparatively light in weight as a result of using a synthetic material housing.

In accordance with an advantageous embodiment, the synthetic material housing and the metal housing cooperate in order jointly to form the cooling channel(s). As an alternative thereto, the respective cooling channel can be formed completely within the synthetic material housing.

Preferably, the metal housing forms a peripheral surface in the region of the stator, wherein the synthetic material housing also forms a peripheral surface in the region of the stator, which peripheral surface corresponds to the peripheral surface of the metal housing and forms together therewith an annular gap. Separating webs are embodied on the peripheral surface of the metal housing or on the peripheral surface of the synthetic material housing or on the two peripheral surfaces. The two peripheral surfaces and the separating webs jointly form the cooling channel(s), i.e. the respective cooling channel is defined by the peripheral surface of the metal housing, the peripheral surface of the synthetic material housing and the aforementioned separating webs. The aforementioned peripheral surfaces can, in particular, be peripheral surfaces of a full cylinder or of a cylinder segment. The separating webs can extend along the entire periphery or only along a part of the periphery of the metal housing and/or the synthetic material housing.

It is preferred, if the synthetic material housing peripherally encompasses the metal housing in the region of the stator in order finally to form a peripherally closed cooling water jacket in the annular gap between the peripheral surfaces. However, the synthetic material housing can also only be provided along a defined peripheral region of the metal housing, corresponding to the aforementioned cylinder segment.

The cooling channels preferably extend in the peripheral direction with respect to a longitudinal axis of the stator and/or the rotor, in order to cool the metal housing in the region of the stator effectively and to simplify the manner in which the cooling fluid is conveyed. However, the cooling channels can also extend relative thereto in a helical manner or in an axial direction.

The synthetic material housing can be embodied in one piece. In this case, the synthetic material housing is placed on the metal housing preferably in the axial direction (again in relation to the longitudinal axis of the stator and/or the rotor). As an alternative thereto, the synthetic material housing can be embodied in two pieces, wherein the separating plane of the two housing parts extends preferably through the aforementioned longitudinal axis of the stator and/or the rotor. In particular, the two housing parts can in this case correspond substantially to two half-cylinder surfaces.

In addition, it is preferred if the synthetic material housing comprises integrated seal sections. These seal sections can be formed, for example, during the process of manufacturing the synthetic material housing in accordance with an injection molding method by virtue of injection molding the seals at the same time, i.e. appropriate rubber seals are placed in the mold prior to the injection molding process.

In accordance with a particularly advantageous embodiment, the synthetic material housing comprises, in addition, a switching housing section, in which an electric circuit of the drive unit is received, it is also necessary to cool said electric circuit. For this purpose, the cooling channel(s) is/are guided to the switching housing section in order to cool the electric circuit arranged therein. In the case of the electric circuit concerned, it can be, for example, a switch-mode power supply, in particular an inverter.

In order to avoid electro-magnetic faults in the aforementioned circuit as a result of operating the electric machine, preferably at least one metal foil or a sheet metal plate is placed in or installed in the switching housing section of the synthetic material housing.

In accordance with a further embodiment, the drive unit can comprise a transmission (in particular, a reduction gear) and a lubricating fluid circuit in order to lubricate the transmission or also the rotor of the electric machine with a separate lubricating fluid (e.g., lubricating oil) and/or to cool said transmission or rotor. In other words, in this case two fluid circuits are provided, namely the cooling fluid conveyed in the cooling channels of the synthetic material housing for cooling the stator from the outside (via the metal housing) and the lubricating fluid conveyed within the metal housing. As a consequence, two different temperature levels of the two cooling and/or lubricating fluids are achieved, and the aforementioned cooling fluid can also be used to cool the aforementioned lubricating fluid.

For this purpose, it is further preferred if the drive unit comprises a sump for the lubricating fluid, wherein the sump simultaneously forms a heat exchanger for discharging heat from the lubricating fluid (e.g., oil) to the cooling fluid (e.g., water).

BRIEF DESCRIPTION OF THE DRAWINGS

The invention is explained hereinunder merely by way of example with reference to the drawings.

DETAILED DESCRIPTION OF EMBODIMENTS

Figure 1:
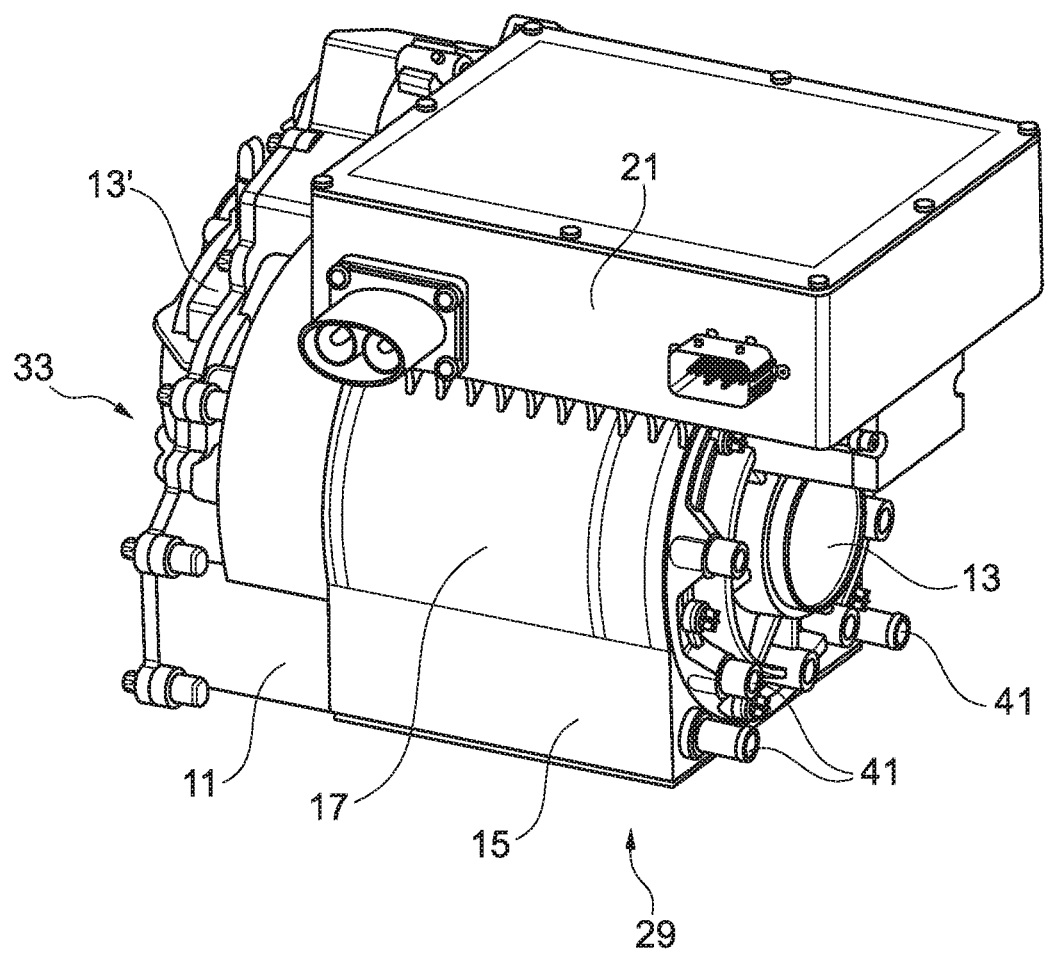
FIG. 1 illustrates a respective perspective view of an electric drive unit.
Figure 2:
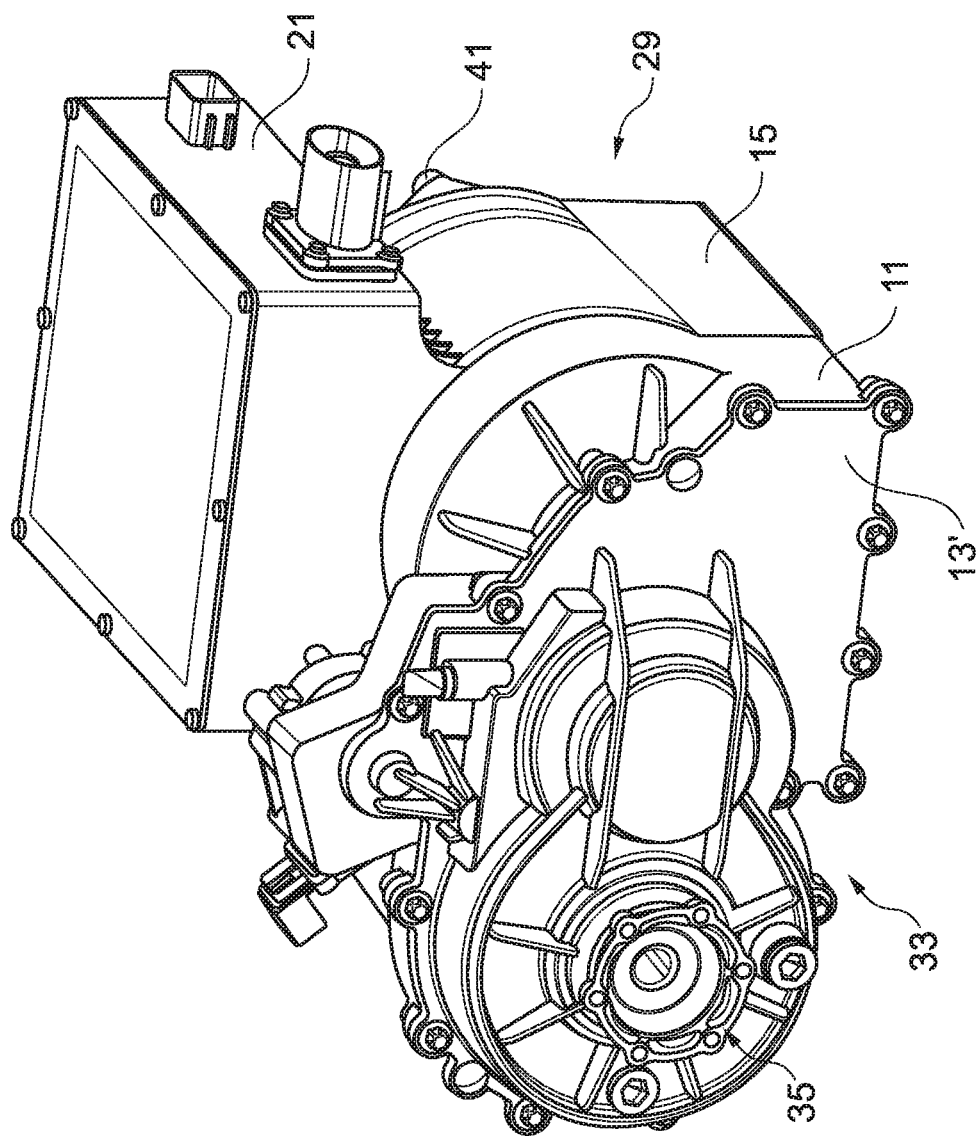
FIG. 2 illustrates a respective perspective view of an electric drive unit.

The electric drive unit illustrated in FIGS. 1 to 4 comprises a metal housing 11 that is closed on both its end faces by a respective cover 13, 13'. The metal housing 11 is preferably cast from aluminum. In addition, the drive unit comprises a synthetic material housing 15 having a cylindrical peripheral surface 17 that peripherally encompasses a cylindrical peripheral surface 19 of the metal housing 11. In addition, the synthetic material housing 15 comprises a rectangular box-shaped switching housing section 21 that is placed on the upper face thereof.

Within the peripheral surface 19, a stator 23 is pressed into the metal housing 11. A rotor 25 is arranged within the stator, which rotor is rotatably connected to an output shaft 27 that is rotatably mounted in the metal housing 11. The stator 23 and the rotor 25 form an electric machine 29, in particular, an AC-asynchronous machine. An inverter 31 is allocated to the electric machine 29, which inverter is arranged within the switching housing section 21.

In addition, the illustrated drive unit comprises a helical gear box 33 that is coupled on the input side to the output shaft 27 of the electric machine 29 and on the output side to a connecting flange 35.

A particular aspect of the illustrated drive unit resides in the fact that the synthetic material housing 15 together with the metal housing 11 forms an open cooling water circuit for cooling the stator 23 via the metal housing 11. For this purpose, a plurality of separating webs 37 that are of different widths and extend in the peripheral direction are formed on the outer face of the peripheral surface 19 of the metal housing 11. A plurality of cooling channels 39 are formed by virtue of the separating webs 37, the outer face of the peripheral surface 19 of the metal housing 11 and the inner face of the peripheral surface 17 of the synthetic material housing 15, through which cooling channels cooling water can flow in the peripheral direction along the peripheral surface 19 of the metal housing 11. As a consequence, a peripherally closed cooling water jacket is formed in order to cool the stator 23 which is connected thereto by conducting heat along the metal housing 11.

A plurality of cooling water connections 41 are provided on the synthetic material housing 15 in order to supply the required cooling water to the cooling channels 39 and/or to carry said cooling water away therefrom. A branch of the cooling water circuit formed in this manner also leads to the switching housing section 21 in order by means of the cooling water to cool the inverter 31 that is arranged there.

Figure 3:
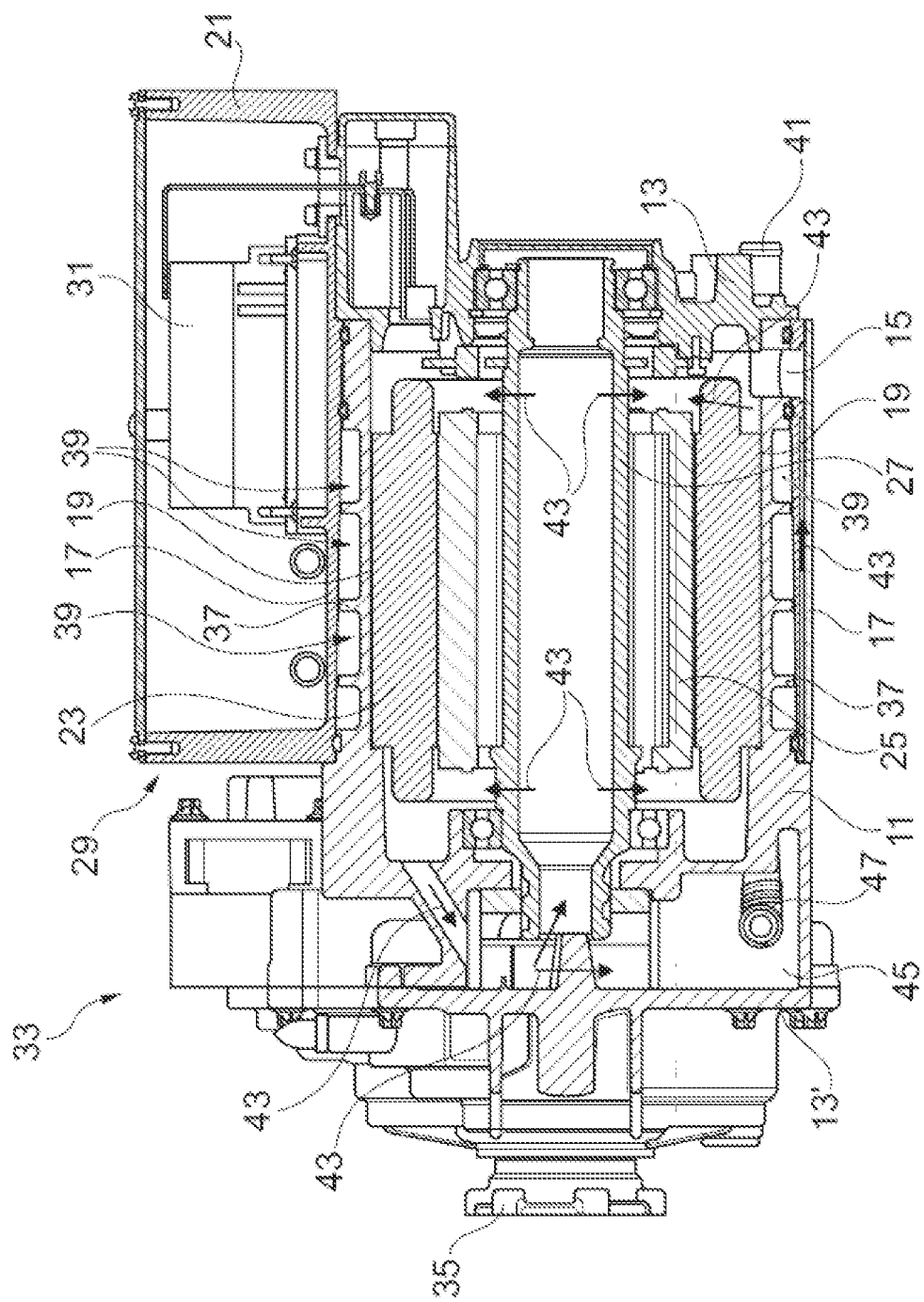
FIG. 3 illustrates a longitudinal sectional view of the electric drive unit.
Figure 4:
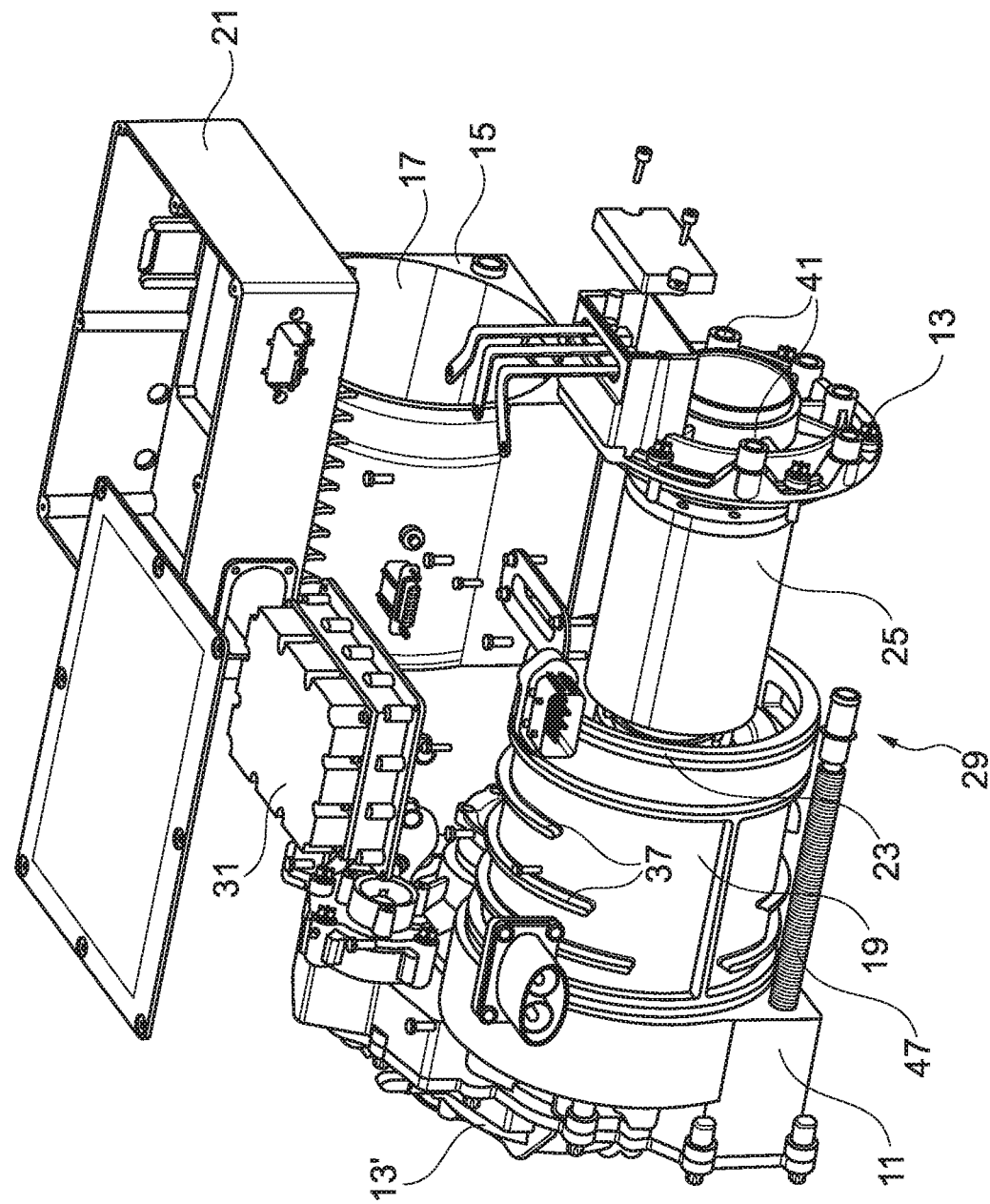
FIG. 4 illustrates an exploded view of the electric drive unit.

In addition, the illustrated drive unit comprises a closed oil circuit in order to lubricate and cool the helical gear box 33 and in order also to lubricate the bearings for the output shaft 27 and to cool the rotor 25. The flow direction of the lubricating oil is illustrated in FIG. 3 by the arrows 43. A sump 45 is allocated to the oil circuit and a pipe 47 of the cooling water circuit is routed through said sump 45. The sump 45 and the pipe 47 thus form a heat exchanger in order to discharge heat from the lubricating oil to the cooling water.

Thus, as a result, two cooling circuits that have different temperature levels are formed, so that, in particular, the inverter 31 can also be held by means of the cooling water at a lower temperature level (approx. 80° C.) than the temperature of the lubricating oil (approx. 130° C.).

LIST OF REFERENCE NUMERALS

11 Metal housing
13, 13' Cover
15 Synthetic material housing
17 Peripheral surface of the synthetic material housing
19 Peripheral surface of the metal housing
21 Switching housing section
23 Stator
25 Rotor
27 Output shaft
29 Electric machine
31 Inverter
33 Helical gear box
35 Connecting flange
37 Separating web
39 Cooling channel
41 Cooling water connection
43 Flow direction of the lubricating oil
45 Sump
47 Pipe

What is claimed is:

1. An electric drive unit comprising:
a first housing composed of metal;
a stator received in the first housing;
a rotor which rotates relative to the stator;
a second housing composed of a synthetic material and provided on the first housing in a region adjacent to the stator, wherein the second housing forms at least one fluid channel through which flows a fluid which cools the stator via the first housing;
a transmission; and
a second fluid channel through which flows a second fluid which lubricates and cools the transmission.

2. The electric drive unit of claim 1, wherein the first housing and the second housing cooperate to jointly form the at least one cooling channel.

3. The electric drive unit of claim 1, wherein a peripheral surface of the first housing is inn a region adjacent to the stator.

4. The electric drive unit of claim 3, wherein a peripheral surface of the second housing is in a region adjacent to the stator.

5. The electric drive unit of claim 4, wherein the peripheral surface of the first housing and/or the second housing has a plurality of webs spaced apart from each other.

6. The electric drive unit of claim 5, wherein the peripheral surface of the first housing, the peripheral surface of the second housing and the webs form the at least one cooling channel.

7. The electric drive unit of claim 1, wherein the second housing peripherally encompasses the first housing in the region of the stator.

8. The electric drive unit of claim 1, wherein the second housing comprises a pair of second housing sections.

9. The electric drive unit of claim 1, wherein the second housing comprises integrated sections which are sealed.

10. The electric drive unit of claim 1, wherein the second housing comprises a switching housing section into which is received an electric circuit.

11. The electric drive unit of claim 10, wherein the at least one cooling channel is routed to the switching housing section in order to cool the electric circuit.

12. The electric drive unit of claim 11, further comprising a metal foil provided in the switching housing section.

13. The electric drive unit of claim 11, further comprising a sheet metal plate provided in the switching housing section.

14. The electric drive unit of claim 1, further comprising a sump sized to receive the second fluid.

15. The electric drive unit of claim 14, wherein the sump forms a heat exchanger that enables heat exchange between the first fluid and the second fluid during operation of the electric drive unit.

16. A drive unit comprising:
a motor;
a first housing configured to receive the motor and composed of a first material;
a second housing composed of a second material which is different than the first material;
a transmission;
a fluid channel in the first housing through which flows a fluid which cools the motor via heat exchange with the first housing during operation of the drive unit; and
a second fluid channel through which flows a second fluid which lubricates and cools the rotor.

17. A drive unit comprising:
a motor having a stator;
a first housing compose of a first material, the first housing configured to receive the electric motor, the peripheral surface of the first housing having a plurality of webs spaced apart from each other;
a second housing composed of a second material which is different than the first material;
a plurality of first fluid channels formed by the webs and the second housing and through which flows a fluid which cools the stator via heat exchange with the first housing during operation of the drive unit;
a transmission; and
a second fluid channel through which flows a second fluid which lubricates and cools the transmission and the rotor.

* * * * *